July 4, 1933. A. C. STEWART ET AL 1,916,869
LOADING PLATFORM OR LIKE ATTACHMENT FOR VEHICLES
Filed Nov. 16, 1931    2 Sheets-Sheet 1
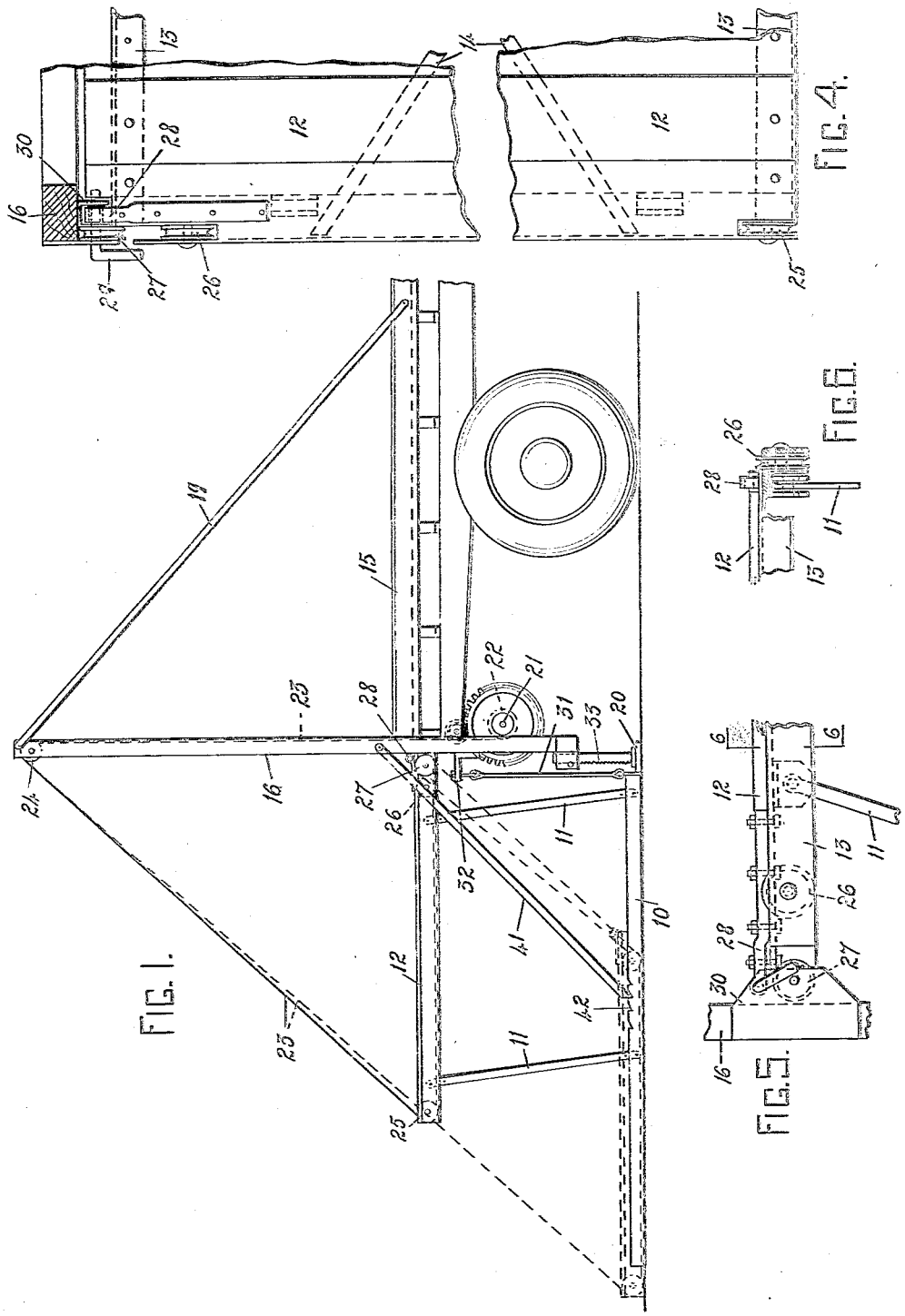
INVENTORS:
Alastair Campbell Stewart
and James Campbell July 4, 1933. A. C. STEWART ET AL 1,916,869
LOADING PLATFORM OR LIKE ATTACHMENT FOR VEHICLES
Filed Nov. 16, 1931 2 Sheets-Sheet 2
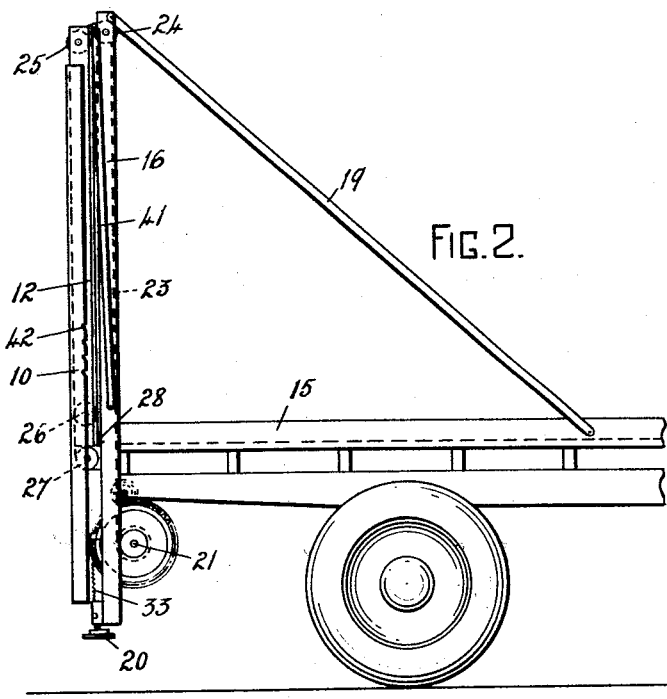
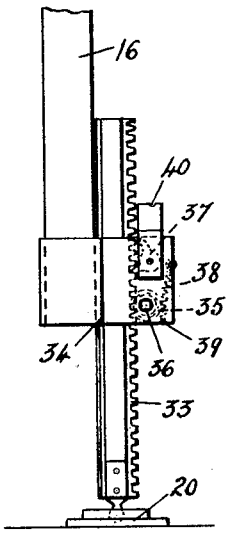
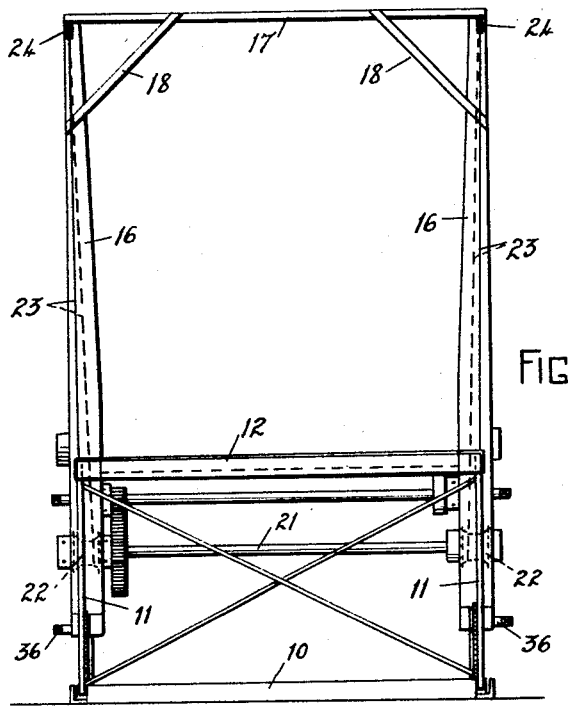
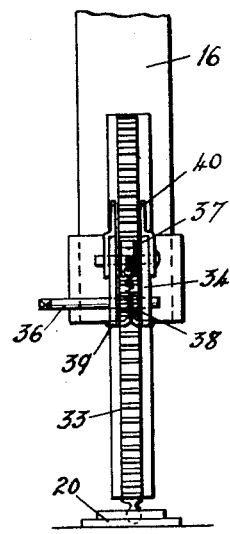
INVENTORS.
Alastair Campbell Stewart
and James Campbell Patented July 4, 1933

1,916,869

UNITED STATES PATENT OFFICE

ALASTAIR CAMPBELL STEWART, OF CRIANLARICH, AND JAMES CAMPBELL, OF DOUNE, SCOTLAND

LOADING PLATFORM OR LIKE ATTACHMENT FOR VEHICLES

Application filed November 16, 1931, Serial No. 575,334, and in Great Britain November 18, 1930.

This invention relates to a movable loading platform for attachment to vehicles for the purpose of enabling loads placed on the movable platform to be lifted to the level of the vehicle to which the load can then be transferred. In a similar manner loads transferred from the vehicle to the platform can be lowered to the ground. The loading platform and its mechanism is a complete unit which can be readily fixed to or detached from the vehicle.

The invention relates to that class of elevator in which a load supporting frame or platform is connected by the pivoted struts of a parallel motion mechanism to a foundation frame for parallel movement relative thereto and the present invention consists in hingedly attaching the load supporting frame or platform to the vehicle and providing winch mechanism whereby the load supporting frame or platform may be swung about the hinge connection to the vehicle, so as to move it into or out of a vertical position. When swung into its vertical position, the complete unit comprising the load supporting frame or platform, the foundation frame and the parallel motion mechanism will collapse, and when the unit is swung into a more or less horizontal position, the said unit will extend until the foundation frame rests upon the ground with the load supporting frame or platform supported therefrom by the said struts or parallel motion mechanism.

The said winch mechanism is preferably also utilized to raise the load supporting frame or platform above the foundation frame when the latter rests on the ground.

According to the preferred manner of carrying out the invention, the load supporting frame or platform is mounted behind or at one side of the vehicle for parallel horizontal movement between the ground level and the level of the vehicle floor upon a foundation frame and is raised or lowered by two or more rope, cable or chain slings attached to the vehicle and passing over pulleys on the load supporting frame or platform in such a manner that the coiling of the wires, ropes or chains upon or their uncoiling from winding drums shortens or lengthens the slings and thus effects the raising or lowering of the load supporting frame or platform above its foundation frame.

When the load supporting frame or platform is raised to vehicle floor level, it is attached to the vehicle by a hinge joint and can be folded into an upright position at the end or side of the vehicle. The said slings are employed for folding the load supporting frame or platform into an upright position.

The load supporting frame or platform is connected by any suitable parallel motion mechanism to the foundation frame which is adapted to rest on the ground. The parallel motion mechanism may consist of a plurality of parallel radius arms or struts, the lower ends of which are pivoted to the foundation frame and the upper ends to the load supporting frame or platform. The lift effected by the slings is thus assisted by the leverage of the radius arms or struts about their lower pivots.

The accompanying explanatory drawings illustrate one manner of carrying out the invention. Figs. 1 and 2 are side views of the unit attached to the rear part of a vehicle, Fig. 1 showing the unit resting on the ground and Fig. 2 showing the unit folded into its upright position. Fig. 3 is an end view of the parts in the position shown in Fig. 1. Fig. 4 is a fragmentary plan view of one end of the load supporting platform, Fig. 5 a side view of the hinged end of the platform, and Fig. 6 a sectional view on the line 6—6 of Fig. 5. Figs. 7 and 8 are views at right angles to each other showing the adjustable feet for stabilizing the structure on uneven ground.

As shown in the drawings, a foundation frame 10 of angle-iron or other material suitably braced is provided to rest on the ground and two pairs of radius bars or struts 11 are pivoted thereto, the upper ends of the radius bars or struts being pivoted to the underside of a load supporting platform 12 which may be a wooden or other suitable floor on a light angle-iron frame 13 suitably braced at 14. Detachably secured to the rear of the vehicle 15 is an upright framework consisting of vertical columns 16 braced together by a cross beam 17 and ties 18 and braced to the vehicle sides by suitable side struts or stays 19. The lower ends of the columns 16 are fitted with adjustable feet 20 (Figs. 7 and 8 to support the tail of the vehicle from the ground while loading and unloading. When the vehicle is in motion, the adjustable feet 20 are raised clear of the roadway. The upright columns 16 support a cross shaft 21 upon which a pair of winding drums 22 is mounted. This shaft may be either hand or power-operated through suitable gearing or it may be driven from the engine of the vehicle through a suitable clutch. Ropes or cables 23 attached at one end to the winding drums pass up to and over pulleys 24 at the top of the upright columns 16 down to and over pulleys 25 at the rear of the platform 12, around pulleys 26 at the front of the platform 12 and around pulleys 27 secured to upright columns 16 just below the vehicle floor level, the ends of the ropes being made fast to the platform 12.

A brake (not shown) may be fitted on the winding shaft 21 or at any other convenient position in the lifting mechanism so that the platform 12 can be lowered under safe control and the mechanism secured while the vehicle is in motion.

Hinge members 28 at the front of the platform 12 can be engaged by hinge pins 29 slidable in complementary hinge members 30 on the vertical columns 16 when the platform is raised to floor level, and after the hinge members have been connected by the insertion of the hinge pins 29, the winding ropes 23 can be employed to fold the platform 12 into an upright position. At the same time the foundation frame 10 will turn upwards with the platform 12 and fall down against the back of the platform 12 clear of the ground.

Tie ropes or other flexible members 31 secured to the front end of the foundation frame 10 and adjustably secured to brackets 32 on the upright columns 16 assist in maintaining the front end of the foundation frame at the proper level to ensure that the hinge members 28 on the platform 12 will correctly register with the hinge members 30 on the columns 16.

The adjustable feet, as shown in Figs. 7 and 8, consist of treads 20 carried by a ball and socket or other universal joint at the lower ends of rack bars 33 slidable vertically in guides 34 on the lower ends of the columns 16, the rack bars 33 being engaged by pinions 35 having operating spindles 36. A two-way pawl 37 engages the rack bars 33, the pawl 37 being controlled by a spring 38 attached at one end to the pawl and adapted to be engaged at its other end with the guide bracket 34 either at 39 or 40. As shown in Fig. 7, the position of the spring is such that the pawl will allow the foot 20 to be extended by rotation of the spindle 36 and pinion 35 and will hold it in its extended position. If the spring 38 is detached at 39 and engaged at the point 40, the pawl will allow the foot 20 to be drawn back by rotation of the spindle 36 and pinion 35 and will prevent the foot from dropping down to the ground.

The adjustable feet 20 act as stops for the front end of the foundation frame 10 and prevent it from creeping along the ground during the lifting motion, but sprags may be employed for this purpose.

For live stock or other movable loads, the platform 12 may be fenced in on two or more sides.

If so desired, the winding shaft 21 may be carried on the platform 12, in which case one end of the rope will be attached to the vertical columns 16.

Although we have described the use of radius bars or struts 11 for attaining the parallel lift, any other arrangement may be provided, for example toggle links, to enable the platform 12 to be raised and lowered relatively to the foundation frame 10.

The front end of the platform may be hingedly engaged by any suitable means with the rear end of the vehicle, and provision may be made for hingedly attaching the platform to the vehicle at varying heights. For example, rollers or the like on the front of the platform may engage upright channels on the vehicle. In such case the links of the parallel-motion mechanism may be telescopic so that the maximum height to which the platform can be raised can be varied, and forward motion of the vehicle may be employed to pull the platform forward and thus raise it to floor level, the rollers riding up the vertical channels.

As shown in Fig. 1, hinged stays 41 hinged to the upright columns 16 and adapted to engage one of a series of rack teeth 42 on the foundation frame, may be provided to steady the foundation frame during the raising and lowering of the platform 12. When the unit is to be swung into its upright position, the stays 41 are disengaged from the foundation frame and are swung into an upright position. Obviously the stays 41 could be pivoted to the foundation frame and engage rack teeth on the columns 16.

That platform 12 can also be used to run wheeled trucks or containers on and off the vehicle. For example, if when the platform 12 is in the position shown in Fig. 1, it is tilted about the hinge pins 29, by coiling the ropes on the winch drums, a wheeled truck or container on the platform 12 will run automatically into the vehicle and a truck or container may be drawn out of the vehicle and run up the inclined platform 12 to a receiving station at a level above the vehicle floor.

The platform 12 can be sustained in the upright folded position and in any intermediate position between ground level and the vehicle floor level by applying a brake to the winch mechanism, so that the platform 12 can be used for discharging and receiving loads at any level below the vehicle floor level. Moreover, if the struts 11 are longer than the height of the vehicle floor from the ground, they will enable the platform 12 to be raised above the level of the vehicle floor to receive loads from a higher level than the vehicle floor. After the platform has been loaded, it can then be lowered until the hinge pins 29 can be engaged with the hinge eyes 28 on the vehicle. To effect this it is necessary to move the vehicle towards the platform 12 while lowering the platform to the level of the vehicle floor.

By detaching the columns 16 and side stays 19 from the vehicle, the complete unit can be removed from the vehicle and is self-supporting when in the position shown in Fig. 1 so that the vehicle can be backed towards it or driven away from it.

The adjustable feet 20, when lowered to the ground, relieve the vehicle of any undue stress and the adjustable ties 31 allow for any unevenness in the ground on which the foundation frame rests.

To assist the platform 12 in its initial movement from the ground, leverage may be applied to the platform 12 by short levers pivoted to the foundation frame 10 and acting on the struts 11 or platform 12, the levers being connected by separate hawsers to winch mechanism either separate from or on the winding shaft 21, or by hawsers connected to the vehicle, the vehicle being driven forwards to effect the initial leverage.

What is claimed is:—

1. In combination with or for attachment to a vehicle, a loading device comprising a load-supporting frame or platform, means for hingedly attaching it to the vehicle, a foundation frame, parallel motion mechanism connecting said frames, and winch mechanism for swinging the load supporting frame or platform about its hinged connection to the vehicle.

2. A loading device according to claim 1, wherein the winch mechanism also serves to raise the load supporting frame or platform above the foundation frame when the latter rests on the ground.

3. In combination with or for attachment to a vehicle, a loading device comprising a load-supporting frame, means for hingedly attaching it to a vehicle, a foundation frame, parallel motion mechanism connecting said frames, a plurality of winding drums, flexible slings coiled on said drums, and pulleys on the load supporting frame and vehicle over which said slings are passed.

4. In combination with or for attachment to a vehicle, a loading device comprising a load-supporting frame, means for hingedly attaching it to a vehicle, a foundation frame, parallel motion mechanism connecting said frames, a plurality of winding drums, flexible slings on said drums, overhead and lower pulleys attached to the vehicle, and pulleys attached to the rear and front of the load-supporting frame, said slings passing from the drums, around the overhead pulleys, around the pulleys at the rear and front of the load-supporting frame, then around the lower pulleys on the vehicle and being attached at their other ends to the load supporting frame.

5. In combination with or for attachment to a vehicle, a loading unit comprising an upright framework adapted to be detachably secured to the vehicle, a load-support, means for hingedly attaching it to said framework, a foundation frame, parallel motion mechanism connecting said support to said frame, and winch mechanism mounted on said framework for swinging the load-support about its hinged attachment to said framework.

6. In combination with or for attachment to a vehicle, a detachable loading unit as specified in claim 5 having adjustable feet on the lower part of the upright framework for supporting it from the ground.

7. In combination with or for a vehicle, a loading device as specified in claim 1 having adjustable ties for suspending the front of the foundation frame from the vehicle in correct parallelism with the floor of the vehicle.

8. In combination with or for a vehicle, a loading device as specified in claim 1 having brake mechanism for sustaining the load-supporting frame when raised above the foundation frame.

9. In combination with or for a vehicle, a loading device comprising a load-support, a foundation frame, parallel motion mechanism connecting said support to said frame, channels adapted to be attached in an upright position to the rear of the vehicle, and roller means on the front of said support and slidably engaging said channels for hingedly attaching said support to said channels and for raising and lowering said support by forward or backward movement of the vehicle when the foundation frame rests on the ground.

10. In combination with or for a vehicle, a loading device comprising a load support, a foundation frame, parallel motion mechanism connecting said support to said frame, means connecting said support to the vehicle, and inclined stays between the foundation frame and the vehicle for positioning said frame in relation to the vehicle.

11. A loading unit for a vehicle comprising a load support, a foundation frame, parallel motion mechanism connecting said support to said frame, a rigid structure for attachment in an upright position to the vehicle, means hingedly connecting one end of said support to said structure, and mechanism carried by said structure and connected to said support for raising and lowering said support in relation to the foundation frame.

12. A loading unit for a vehicle comprising a load support, a foundation frame, parallel motion mechanism connecting said support to said frame, a rigid structure for attachment in an upright position to the vehicle, means hingedly connecting one end of said support to said structure, and mechanism carried by said structure and connected to said support for raising and lowering said support in relation to the foundation frame and for folding said support against said structure.

13. A loading and unloading device adapted to be detachably secured to a vehicle, comprising, in combination, a base member adapted to rest on the ground, a load-carrying member connected to said base member by pivoted links, means for raising and lowering said load carrying member in relation to said base member, and means for folding the said members close together in a vertical position suspended at the tail end of said vehicle.

14. In a device of the character described in claim 13, adjustable supports for compensating for unevennesses of the ground surface and simultaneously bracing the device against creeping on the ground.

In testimony whereof we have affixed our signatures.

ALASTAIR CAMPBELL STEWART.
JAMES CAMPBELL.